United States Patent [19]
Suzuki et al.

[11] Patent Number: 5,356,156
[45] Date of Patent: Oct. 18, 1994

[54] GAME APPARATUS AND METHOD OF PLAYING A GAME

[75] Inventors: Toshihiro Suzuki, Tokyo; Kazuya Minamino, Kyoto; Akifumi Kubota, Tokyo, all of Japan

[73] Assignee: Kabushiki Kaisha Bandai, Japan

[21] Appl. No.: 45,932

[22] Filed: Apr. 12, 1993

[30] Foreign Application Priority Data

Oct. 27, 1992 [JP] Japan .................. 4-311314

[51] Int. Cl.⁵ .............................................. G06F 3/14
[52] U.S. Cl. ........................... 273/437; 273/85 G;
273/434; 395/118; 395/137; 395/152; 364/410;
345/122; 345/126
[58] Field of Search ........................ 273/434-437,
273/85 G, DIG. 28; 395/118, 137, 152;
364/410; 340/723-726

[56] References Cited

U.S. PATENT DOCUMENTS

| | | | |
|---|---|---|---|
| 4,026,555 | 5/1977 | Kirschner et al. | 273/85 R |
| 4,445,114 | 4/1984 | Stubben | 340/726 |
| 4,580,779 | 4/1986 | Kanamura et al. | 273/435 X |
| 4,672,541 | 6/1987 | Bromley et al. | 364/410 |
| 4,834,374 | 5/1989 | Nakamura et al. | 273/434 |
| 5,080,377 | 1/1992 | Stamper et al. | 273/437 |
| 5,125,671 | 6/1992 | Ueda et al. | 273/437 |
| 5,187,776 | 2/1993 | Yanker | 395/157 |
| 5,239,464 | 8/1993 | Blair et al. | 364/410 |

FOREIGN PATENT DOCUMENTS 2233241 1/1991 United Kingdom ................ 273/434

*Primary Examiner*—Jessica J. Harrison
*Assistant Examiner*—Kerry Owens
*Attorney, Agent, or Firm*—R. Gale Rhodes, Jr.

[57] ABSTRACT

A game apparatus which displays contending characters appearing in a match with punch. The whole broad region forming the background is effectively displayed, thus increasing the fun. The apparatus comprises a ROM, a reading means, a display control means, and a position display means. As the characters move, the reading means successively detects the background pictures containing the characters and reads the detected background pictures from the ROM. The display control means displays the plural background pictures for the characters on a single screen. The position display means displays the positional relation between the characters on the screen.

12 Claims, 5 Drawing Sheets

GAME APPARATUS AND METHOD OF PLAYING A GAME

FIELD OF THE INVENTION

The present invention relates to a game apparatus which displays a plurality of frames of background pictures containing different characters on a single screen. This method of display is known as the dual-mode display method.

BACKGROUND OF THE INVENTION

In recent years, various game apparatuses for enjoying match games have been proposed. The body of each of these game apparatuses is connected with a TV receiver. Data is sent to the TV receiver from the body of the game apparatus. A match game or the like can be played while monitoring the contents of the game on the TV screen.

These conventional game apparatuses adopt a so-called single-mode display method. In particular, the background picture portraying the location of the game and a plurality of characters to be matched with each other at this location are displayed on the same screen. Accordingly, where the contending characters are close to each other, the characters and the background picture can be displayed in appropriate size. However, where the distance between the characters increases, the sizes of the characters and of the background picture must be reduced according to the distance. As a result, the game appeals less to the human players.

For this reason, in a golf game, for example, a picture region for displaying the whole area and a picture region showing a small area in enlarged size are provided. The whole field of a golf course is displayed in reduced size on the former picture region. Only the players within this field are displayed in enlarged size on the latter picture region.

Although the motions of the characters playing on the golf course are displayed in enlarged size, the whole field forming the background is displayed in reduced size. Therefore, it has been impossible to effectively display a broad area.

SUMMARY OF THE INVENTION

It is an object of the present invention to provide a game apparatus which displays the motions of contending characters in a game or the like with punch and effectively displays the whole broad background region, thus increasing the fun.

One embodiment of the invention lies in a game apparatus comprising: a storage means storing plural frames of background pictures across which characters can move with the progress of a game; a reading means which successively detects background pictures for the characters as these characters move and which reads the detected background pictures from the storage means; a display control means which displays the plural frames of background pictures containing the characters on a single screen; and a position display means that displays the positional relation between the characters on the screen.

A second embodiment of the invention lies in a game apparatus comprising: a storage means storing plural frames of background pictures across which characters can move with the progress of a game; a reading means which successively detects background pictures for the characters as these characters move and which reads the detected background pictures from the storage means; a display control means which displays the plural frames of background pictures for the characters on a single screen; a position display means that displays the positional relation between the characters on the screen; and a tilt change means which changes the tilt of the boundary line between the frames of background pictures for the characters according to the heights of the characters.

A third embodiment of the invention lies in a game apparatus comprising: a storage means storing plural frames of background pictures across which characters can move with the progress of a game; a reading means which successively detects background pictures for the characters as these characters move and which reads the detected background pictures from the storage means; a display control means which displays the plural frames of background pictures for the characters on a single screen; a position display means that displays the positional relation between the characters on the screen; a tilt change means which changes the tilt of the boundary line between the frames of background pictures for the characters according to the heights of the characters; a first enlargement display means which, when one character attacks, displays its background picture in enlarged size; and a second enlargement display means which, when a flying object due to the attack by the attacking character reaches the background picture for the other character, displays this background picture in enlarged size.

In the first embodiment of the invention, plural frames of background pictures across which characters can move with the progress of the game are stored. As the plural characters move, the background pictures against which the characters appear are read out, and plural background pictures for the characters are displayed on the single screen.

Accordingly, if the distance between the characters increases, the characters can be displayed in enlarged size, whereby their motions can be portrayed with punch. Also, the distance between the characters can be grasped, because the positional relation between the characters is displayed on the screen.

In the second embodiment of the invention, plural frames of background pictures across which characters can move with the progress of the game are stored. As the plural characters move, the background pictures against which the characters appear are read out, and plural background pictures for the characters are displayed on the single screen.

Accordingly, if the distance between the characters increases, the characters can be displayed in enlarged size, whereby their motions can be portrayed with punch. Also, the distance between the characters can be grasped, because the positional relation between the characters is displayed on the screen.

The tilt of the boundary line between the frames of background pictures for the respective characters is changed according to the heights of the characters. Hence, it is easy to distinguish between a character in the air and a character on the ground.

In the third embodiment of the invention, plural frames of background pictures across which characters can move with the progress of the game are stored. As the plural characters move, the background pictures against which the characters appear are read out, and plural background pictures for the characters are displayed on the single screen.

Accordingly, if the distance between the characters increases, the characters can be displayed in enlarged size, whereby their motions can be portrayed with punch. Also, the distance between the characters can be grasped, because the positional relation between the characters is displayed on the screen.

The tilt of the boundary line between the frames of background pictures for the respective characters is changed according to the heights of the characters. Hence, it is easy to distinguish between a character in the air and a character on the ground.

When one character attacks, the background picture for this attacking character is displayed in enlarged size. When a flying object due to this attack reaches the background picture for the other character, this background picture is displayed in enlarged size. Consequently, the tense atmosphere produced on offense and defense can also be depicted.

Other objects and features of the invention will appear in the course of the description thereof which follows.

DETAILED DESCRIPTION OF THE INVENTION

Figure 1:
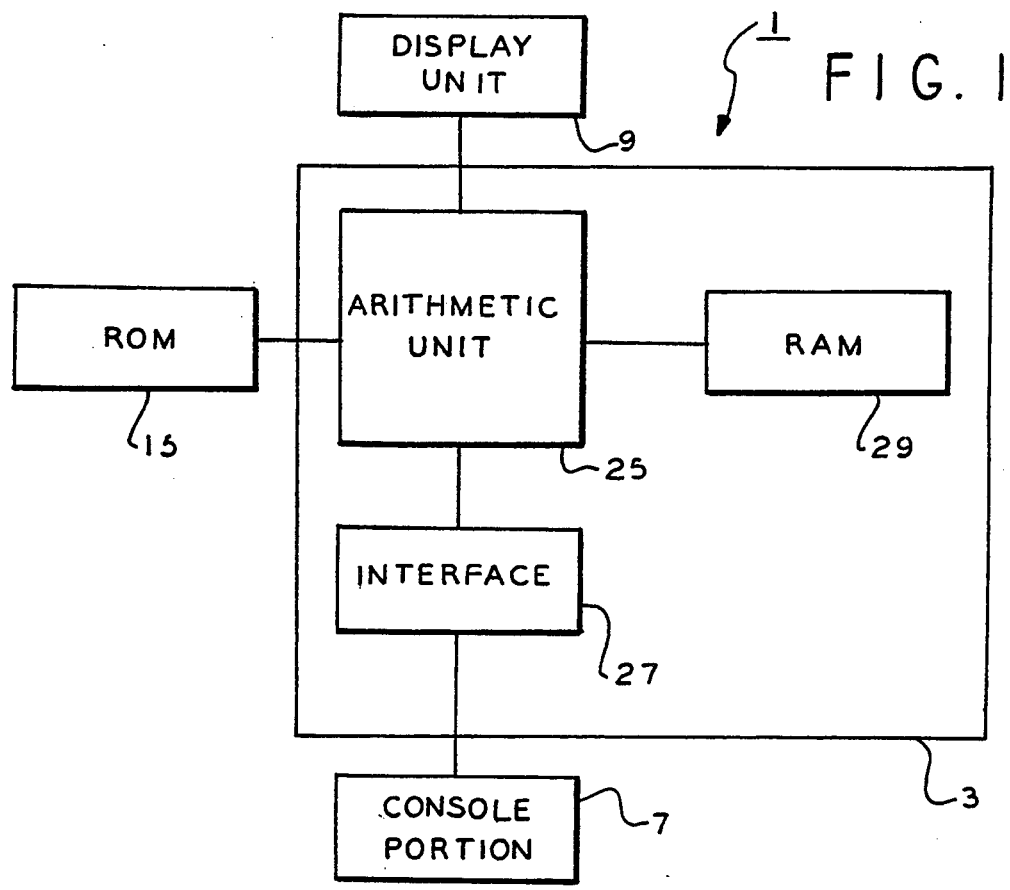
FIG. 1 is a block diagram of a game apparatus according to the invention.
Figure 2:
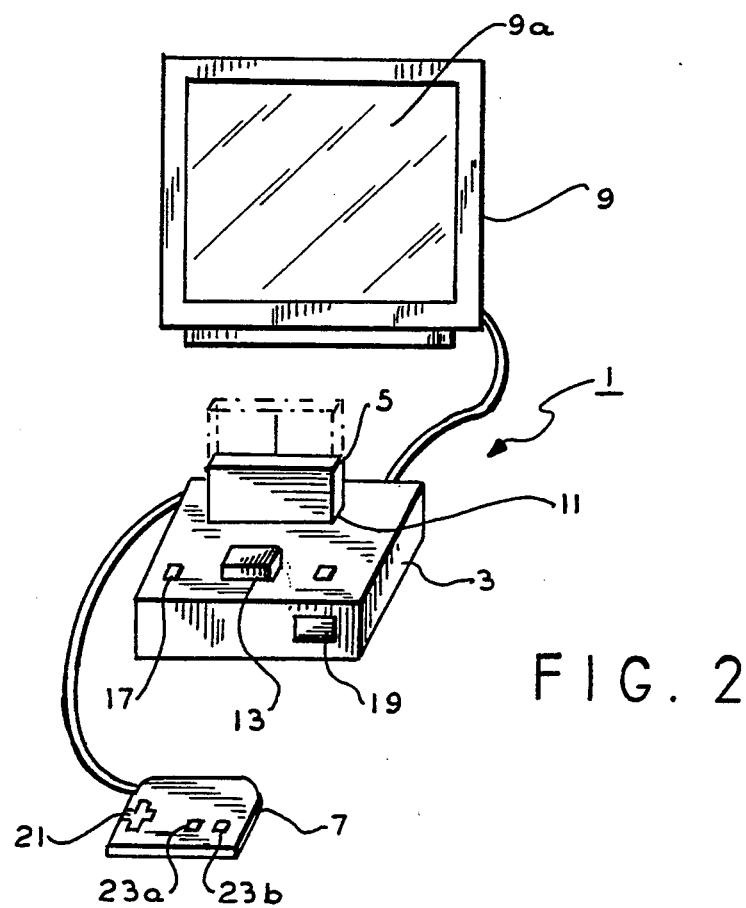
FIG. 2 is a perspective view of the game apparatus shown in FIG. 1.

Referring to FIGS. 1 and 2, there is shown a game apparatus embodying the concept of the present invention. This apparatus, generally indicated by reference numeral 1, comprises a game apparatus body 3, a game cassette 5 removably inserted in the body 3, a console portion 7, and a display unit 9. The body 3 comprises a Cassette insertion hole 11 in which the cassette 5 is inserted, an ejector 13 for ejecting the cassette 5 inserted in the insertion hole 11, a reset switch 17, a power switch 19, and other components. A ROM 15 is incorporated in the cassette 5. When the cassette 5 is inserted in the insertion hole 11, the ROM 15 is electrically connected with the body 3 of the game apparatus. The ROM 15 is a storage means for storing plural frames of background pictures across which characters can move with the progress of a game. Also, programs regarding matches and games are stored in the ROM 15. The console portion 7 has plural control switches including a crisscross button switch 21 for indicating the operations of the characters appearing in games and control button switches 23a, 23b. When these various control switches are operated, the console portion 7 produces corresponding operation signals. As an example, a TV receiver is used as the display unit 9. The aforementioned background pictures and moving pictures of the characters are displayed on the screen 9a of the display unit 9.

The body 3 of the game apparatus is now described in detail. The body 3 comprises an arithmetic unit 25, an interface 27, and a RAM 29. The arithmetic unit 25 is connected with all of the display unit 9, the ROM 15, and the RAM 29. Also, the arithmetic unit 25 is connected with the console portion 7 via the interface 27. This arithmetic unit 25 incorporates a reading control circuit for controlling reading of various kinds of data stored in the ROM 15, a background picture-creating circuit for creating a background picture according to the data read from the ROM 15, a moving picture-creating circuit for creating moving pictures of the characters according to the operation signals from the console portion 7, and a microcomputer for controlling all of these circuits according to the progress of a game. More specifically, the arithmetic unit 25 comprises a reading means and a display control means. The reading means successively detects the background pictures across which the characters appear with movement of the characters. Then, the reading means reads the detected background pictures from the ROM 15. The display control means displays the plural background pictures on the single screen 9a, the characters appearing against the background pictures. The arithmetic means 25 further includes a position display means for displaying the positional relation between the characters on the screen 9a, a tilt change means for changing the tilt of the boundary line between the frame of background picture against which one character appears and the frame of background picture against which the other character appears, according to the heights of the characters, a first enlargement display means for displaying the background picture for the offensive character in enlarged size, and a second enlargement display means for displaying the background picture for the other character in enlarged size when a flying object due to the attack by the offensive character reaches the background picture for the other character.

The operation of the game apparatus constructed as described above is described now. The game cassette 5 incorporating the ROM 15 is inserted into the cassette insertion hole 11 in the body 3 of the game apparatus 1. Then, a game is started by turning the power switch 19 on and operating the operation switches on the console portion 7. The microcomputer in the body 3 of the game apparatus reads fundamental data, for example, about the match and data about background pictures from the ROM 15. The body 3 of the apparatus creates a background picture according to the data read out and creates moving pictures of the characters. The background pictures and the moving pictures of the characters created in this way are displayed on the screen 9a of the display unit 9.

Figure 3:
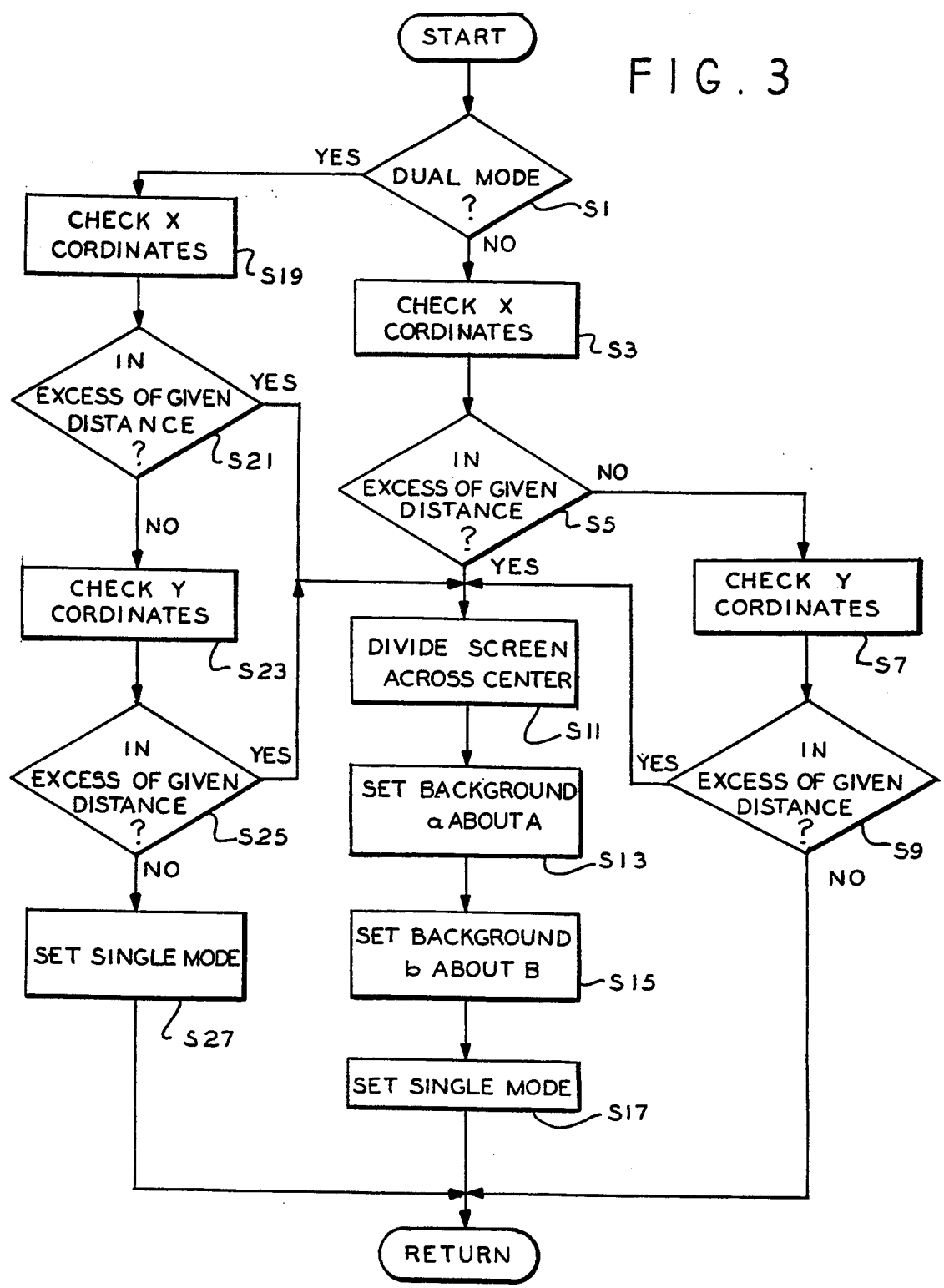
FIG. 3 is a flowchart illustrating a series of operations performed by the game apparatus shown in FIGS. 1 and 2 to control the contents of a game displayed.
Figure 4:
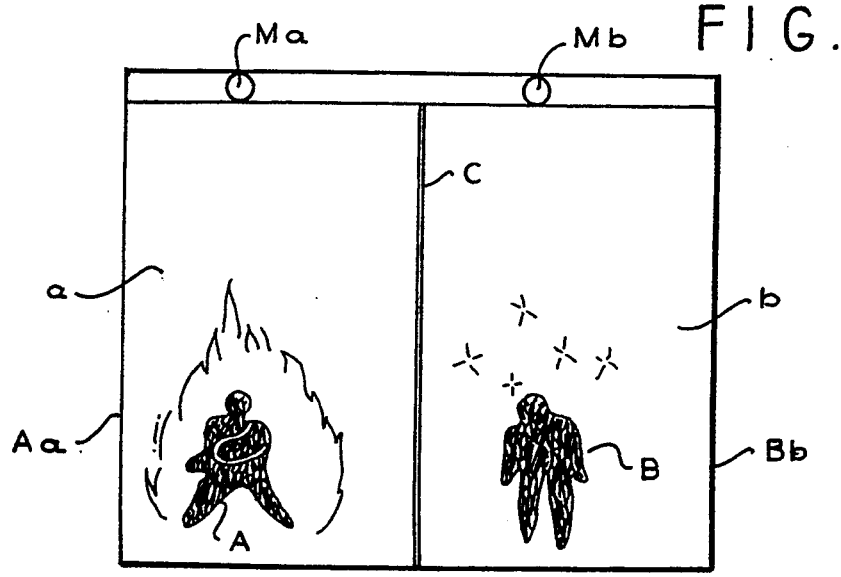
FIG. 4 is a diagram illustrating an example of display provided in the dual mode by the game apparatus shown in FIGS. 1 and 2.

The manner in which the contents of the game displayed on the screen 9a are controlled is next described by referring to FIGS. 3 and 4. A decision is made to see if the display mode is the dual mode or not (step 1). If the mode is not the dual mode, i.e., it is the single mode, then control goes to step 3, where the X coordinates of the two characters A and B are checked. A decision is made to ascertain whether the distance between the characters A and B taken in the direction of the X-axis is in excess of a given value (step 5). If the distance is less than the given value, control proceeds to step 7, where the Y coordinates of the characters A and B are checked. A decision is made to determine whether the distance between the characters A and B taken in the direction of the Y-axis is in excess of a given value (step 9). If this distance is less than the given value, control goes back to step 1. As described thus far, where the characters A and B are close to each other, i.e., when the distances between the two characters taken in the directions of the X- and Y-axes, respectively, are less than the given values, the mode is set to the single mode. The moving pictures of the characters A and B are displayed as a single frame of picture on the screen 9a of the display unit 9, together with a common background picture.

If the result of the decision made in step 5 is that the distance between the characters A and B taken in the direction of the X-axis is in excess of the given value, or if the result of the decision made in step 9 is that the distance between the characters A and B taken in the direction of the Y-axis is in excess of the given value, then control goes to step 11, where the screen 9a is divided into two across the center. In the next step 13, a background picture a is created about one character A. In step 15, a background picture b is created about the other character B. In step 17, the mode of operation is set to the dual mode. As shown in FIG. 4, a frame Aa of the background picture a containing the character A and a frame Bb of the background picture b containing the character B are displayed on the screen 9a. At this time, the width and the color of the boundary line C between the frames Aa and Bb are appropriately set according to the distance between the characters A and B. For example, as the distance between them increases, the width of the boundary line C is increased. At the same time, the color of the boundary line C is changed to white, red, yellow, and blue in this order. This permits the user to visually perceive the distance between the characters A and B.

If the result of the decision made in step 1 is that the display mode is the dual mode, control goes to step 19, where the X coordinates of the two characters A and B are checked. A decision is made to see if the distance between the characters A and B taken in the direction of the X-axis is in excess of a given value (step 21). If the distance between them is less than the given value, control proceeds to step 23, where the Y coordinates of the characters A and B are checked. Then, a decision is made to ascertain whether the distance between the characters A and B taken in the direction of the Y-axis exceeds a given value (step 25). If this distance is less than the given value, control goes to step 27, where the mode is set to the single mode.

If the result of the decision made in step 21 or 25 is that the distance between the characters A and B is in excess of the given value, control goes to step 17 via steps 11, 13, and 15 to continue the control of the display in the dual mode.

Figure 6:
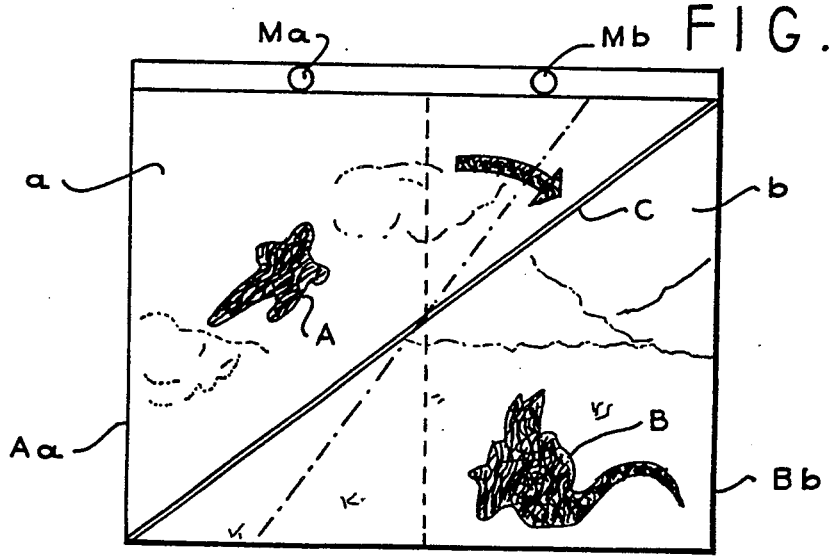
FIG. 6 is a diagram illustrating rotation of a boundary line across the screen of the display unit shown in FIGS. 1 and 2.
Figure 5:
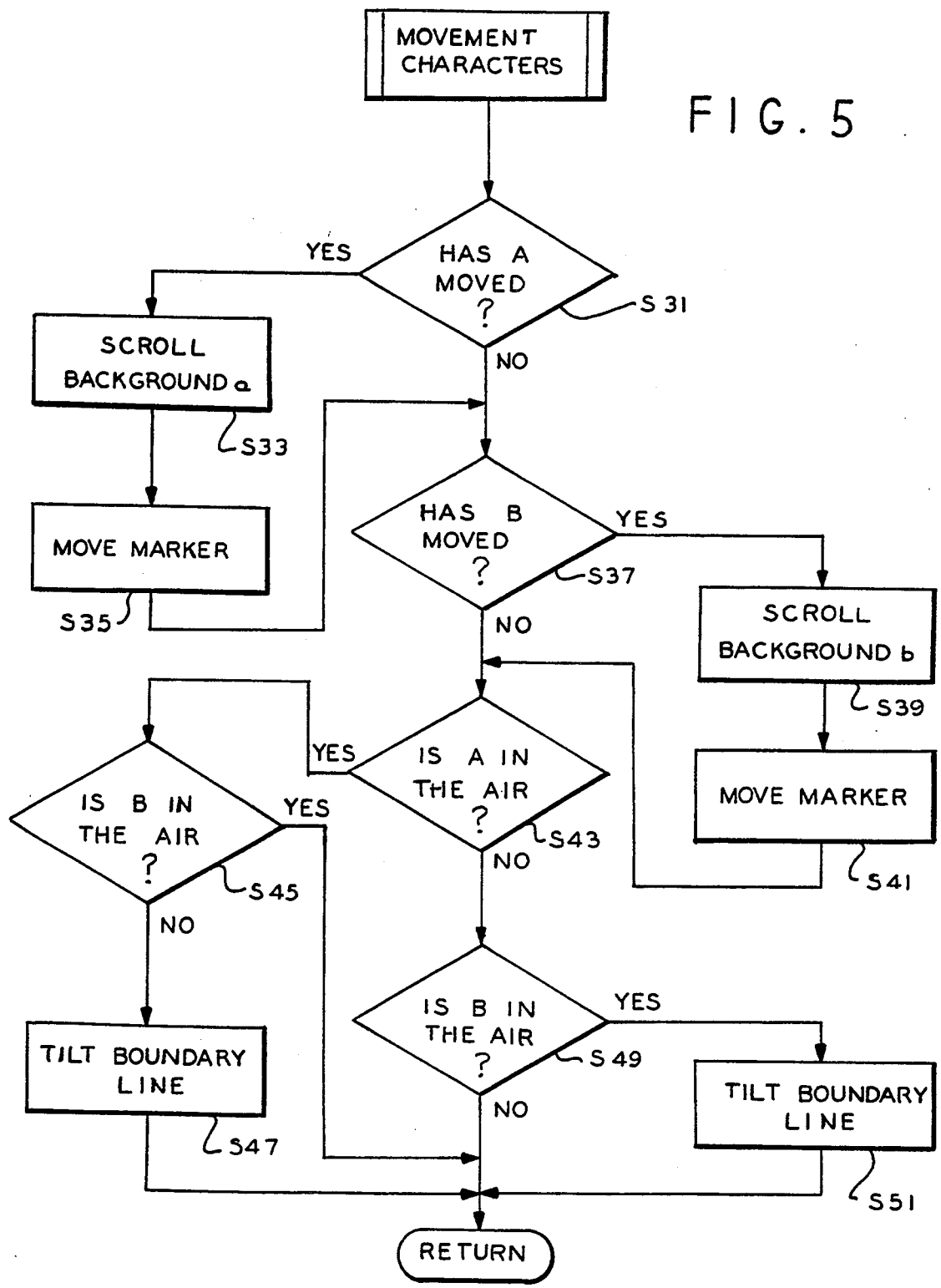
FIG. 5 is a flowchart illustrating the processing performed to move characters in a game played by the game apparatus shown in FIGS. 1 and 2.

The processing for moving the characters is next described by referring to FIGS. 5 and 6. In step 31 illustrated in FIG. 5, a decision is made to see if the character A has moved. If the result of the decision is that the character has moved, then control goes to step 33, where the background picture a is scrolled according to the movement of the character A. Then, a marker Ma indicating the position of the character A on the X-axis is moved according to the movement of the character A (step 35). Control then proceeds to step 37.

If the result of the decision made in step 31 is that the character A has not moved, then control goes to step 37, where a decision is made to see if the character B has shifted. If the result of the decision made in step 37 is that the character B has shifted, then control proceeds to step 39, where the background picture b is scrolled according to the movement of the character B. Subsequently, a marker Mb indicating the position of the character B on the X-axis is moved according to the movement of the character B (step 41), and then control goes to step 43.

If the result of the decision made in step 37 is that the character B has not moved, then control goes to step 43, where a decision is made to see if the character A is in the air by jumping from the ground. If so, control proceeds to step 45, where a decision is made to see if the character B is in the air by jumping from the ground. If the result of the decision made in step 45 is that the character B is not in the air, then control proceeds to step 47. In step 47, the character A is in the air, and the character B is on the ground. Therefore, as indicated by the arrow in FIG. 6, the boundary line C is rotated in a clockwise direction so that the character A lies over the boundary line. The angle through which the boundary line C is rotated is set according to the difference in height between the characters A and B. If the result of the decision is that both characters A and B are in the air, control goes from step 45 back to step 31.

If the result of the decision made in step 43 is that the character A is not in the air, then control goes to step 49, where a decision is made to see if the character B is in the air by jumping from the ground. If so, control goes to step 51. Since the character B is in the air, and the character A is on the ground, the boundary line C is rotated in a counterclockwise direction in such a way that the character B lies over the boundary line (step 51). The angle through which the boundary line C is rotated is set according to the difference in height between the characters A and B. If the result of the decision is that both characters A and B are on the ground, then control goes from step 49 back to step 31.

Figure 8:
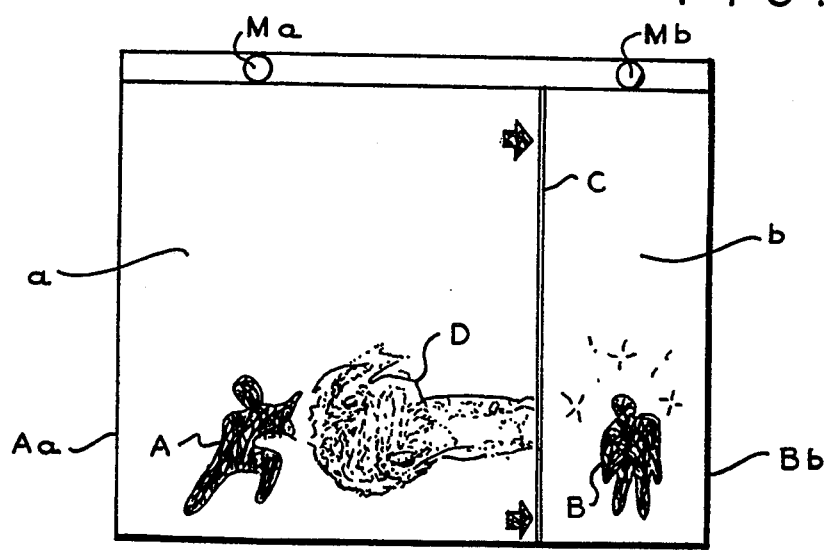
FIG. 8 is a diagram illustrating enlargement of the background picture on the screen of the display unit shown in FIGS. 1 and 2.
Figure 7:
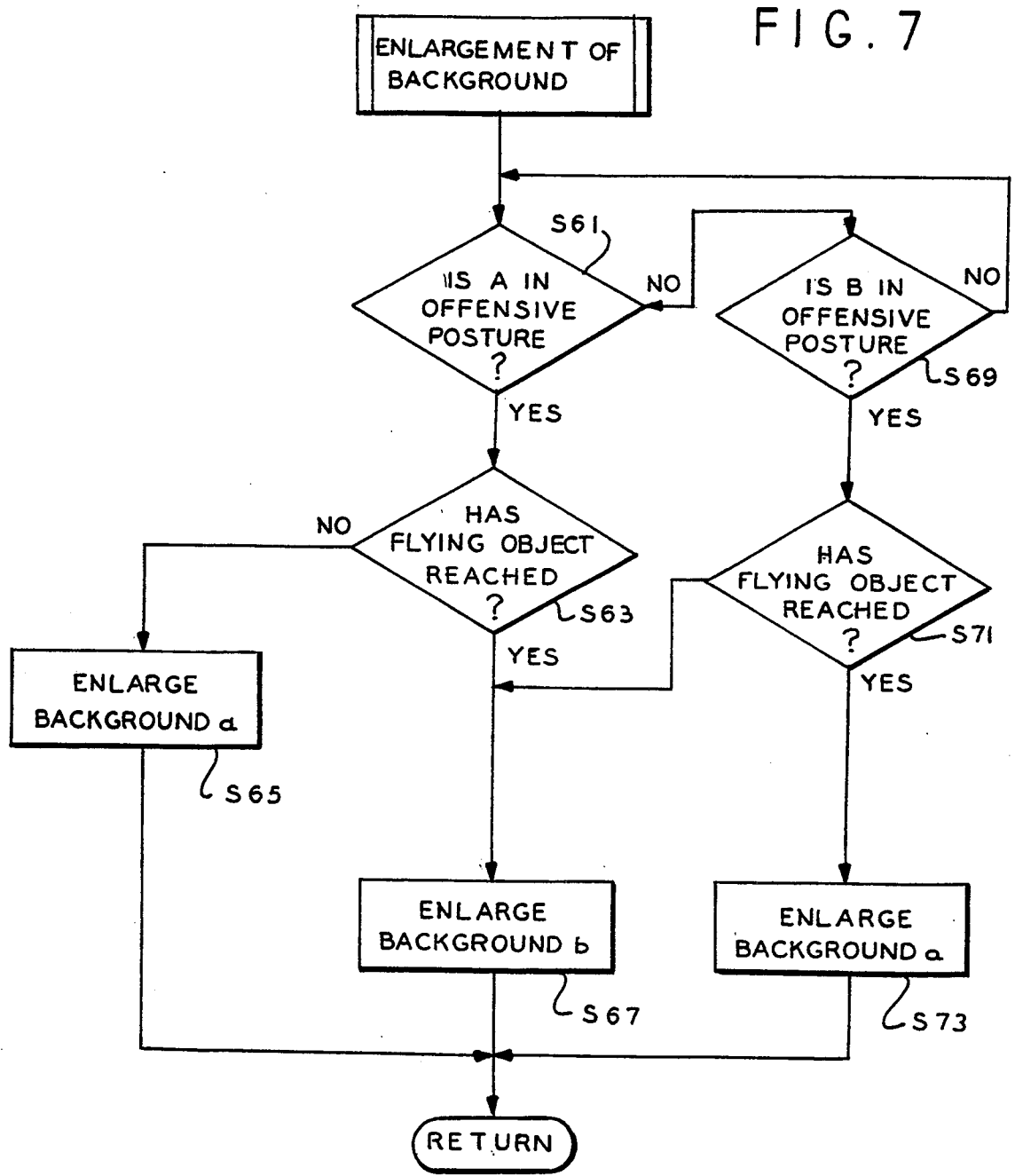
FIG. 7 is a flowchart illustrating the processing performed to enlarge the background picture on the screen of the display unit shown in FIGS. 1 and 2.

The processing for enlarging background pictures is next described by referring to FIGS. 7 and 8. In step 61 illustrated in FIG. 7, a decision is made to see if the character A is in offensive posture. If so, control goes to step 63, where a decision is made to see if a flying object D let off from the character A has reached the background picture b for the character B. If the result of the decision made in step 63 is that the flying object D has not reached the background picture b, then control proceeds to step 65, where the background picture a for the character A is enlarged as indicated by the arrow in FIG. 8.

If the result of the decision made in step 63 is that the flying object D launched from the character A has arrived in the background picture b for the character B, then control goes to step 67, where the background picture b for the character B is enlarged. Control goes from step 67 back to step 61, where the aforementioned processing for enlarging the background picture is continued.

If the result of the decision made in step 61 is that the character A is not in offensive posture, then control goes to step 69. In step 69, a decision is made to see if the character B is in offensive posture. If the result of the decision is that the character B is not in offensive posture, control goes back to step 61. If the result of the decision made in step 69 is that the character B is in offensive posture, control goes to step 71, where a decision is made to see if the flying object let off from the character B has reached the background picture a for the character A. If not so, control proceeds to step 67, where the background picture b for the character B is extended.

If the result of the decision made in step 71 is that the flying object let off from the character B has reached the background picture a for the character A, then control goes to step 73, where this background picture a is enlarged. Control goes from step 73 back to step 61, where the processing for enlarging the background picture is continued.

As described above, the background picture for the character in the offensive posture is enlarged. When a flying object has reached the background for the attacked character, this background picture is enlarged. Consequently, the match can be represented with greater reality, thus increasing the fun.

As described above, in the first embodiment of the invention, plural frames of background pictures across which characters can move with the progress of a game are stored. As the characters move, the background pictures for the characters are read out. The background pictures for the characters are displayed on the single screen. Therefore, if the distance between the characters is increased, they are displayed in enlarged size. In consequence, the characters can be depicted with punch. Moreover, the distance between the characters can be easily grasped, since the positional relation between the characters is displayed on the screen.

In the second embodiment of the invention, the tilt of the boundary line between the frames of background pictures on which the respective characters appear is modified according to the heights of the characters. Hence, it is easy to discriminate between a character in the air and a character on the ground.

In the third embodiment, when one character attacks, the background picture for the attacking character is displayed in enlarged size. When a flying object launched due to the attack by one character reaches the background picture for the other character, this background picture is displayed in enlarged size. Consequently, the tense atmosphere produced on offense and defense can also be depicted.

What is claimed is:

1. A game apparatus comprising:
   a storage means storing characters and plural frames of background pictures across which characters move with the progress of a game, said frames of background pictures having a boundary line therebetween and said boundary line having a tilt;
   an arithmetic unit including:
   (a) a reading means which successively detects the background pictures containing the characters as these characters move and which reads the detected background pictures from the storage means;
   (b) a display control means which displays the plural frames of background pictures containing the characters on a single screen;
   (c) a position display means that displays the positional relation between the characters on the screen;
   (d) a tilt change means which changes the tilt of the boundary line between the frames of background pictures for the characters according to the heights of the characters; and
   (e) a microcomputer and a random access memory for controlling the reading means, display control means, position display means and tilt change means according to the progress of the game.

2. A game apparatus comprising:
   a storage means storing characters and plural frames of background pictures across which characters move with the progress of a game, said frames of background pictures having a boundary line therebetween and said boundary line having a tilt;
   an arithmetic unit including:
   (a) a reading means which successively detects the background pictures containing the characters as these characters move and which reads the detected background pictures from the storage means;
   (b) a display control means which displays the plural frames of background pictures containing the characters on a single screen;
   (c) a position display means that displays the positional relation between the characters on the screen;
   (d) a tilt change means which changes the tilt of the boundary line between the frames of background pictures for the characters according to the heights of the characters;
   (e) a first enlargement display means which, when one character attacks, displays its background picture in enlarged size;
   (f) a second enlargement display means which, when a flying object due to the attack by the attacking character reaches the background picture for the other character, displays this background picture in enlarged size; and
   (g) a microcomputer and a random access memory for controlling the reading means, display control means, position display means and tilt change means according to the progress of the game.

3. Method of playing a game, comprising the steps of:
   creating plural frames of background pictures and at least first and second characters in the X and Y axes move across said frames of background pictures with the progress of the game, said characters having X and Y coordinates in said frames;
   displaying said frames of background pictures and said characters on a single screen;
   determining whether the distances between said characters in the directions of the X and Y axes are less than or in excess of given values and in the event that said distances between the X and Y axes are less than said given values displaying said characters and said frames of background pictures as a single frame of picture on said screen to provide said characters which a common background picture; and
   in the event that any one of said distances between the X and Y axes is greater than the corresponding given value dividing said screen into first and second screen portions and displaying said first character on said first screen portion and creating a first background picture around said first character and displaying said second character on said second screen portion and creating a second background picture around said second character.

4. The method according to claim 3 including the further step of providing a boundary line between said first and second screen portions.

5. The method according to claim 4 wherein said boundary line has width and color and wherein said method includes the further step of changing the width and color of said boundary line in accordance with distances between said characters in said X and Y axes directions.

6. The method according to claim 5 wherein upon distances between said characters increasing said width of said boundary line increases and upon said distances between said characters decreasing said width of said boundary line decreases.

7. The method according to claim 3 including the further step of determining if the first character has moved and in the event that said first character has moved scrolling said first background picture.

8. The method according to claim 3 including the further step of determining if said second character has moved and in the event said second character has moved scrolling said second background picture.

9. The method according to claim 4 wherein said first background picture includes the ground and air above the ground and wherein said method includes the further step of determining whether said first character has jumped from the ground into the air and in the event said first character has jumped from the ground into the air determining the difference in height between the first and second characters and rotating said boundary line toward said second character through an angle determined by the difference in height between said characters.

10. The method according to claim 4 wherein said second background picture includes the ground and air above the ground and wherein said method includes the further step of determining whether said second character has jumped from the ground into the air and in the event said second character has jumped from the ground into the air determining the difference in height between the first and second characters and rotating said boundary line toward said first character through an angle determined by the difference in height between said characters.

11. The method according to claim 3 wherein said first background picture includes a first flying object and wherein said method includes the further step of determining whether said first flying object has been launched from said first character toward said second character and said first flying object is appearing in said second background picture and in the event it is determined that said first flying object is not appearing in said second background picture enlarging said first background picture, and in the event that it is determined that said first flying object is appearing in said second background picture enlarging said second background picture.

12. The method according to claim 11 wherein it is determined that said first flying object is not appearing in said second background picture and wherein said second background picture includes a second flying object and wherein the method includes the further step of determining whether said second flying object has been launched from said second character toward said first character and is appearing in said first background picture and in the event that it is determined that said second flying object is not appearing in said first background picture enlarging said second background picture, and in the event that it is determined that said second flying object is appearing in said first background picture enlarging said first background picture.

* * * * *